(12) United States Patent
Kato et al.

(10) Patent No.: US 6,787,587 B1
(45) Date of Patent: Sep. 7, 2004

(54) PROCESS FOR THE PRODUCTION OF LOW-MOLECULAR-WEIGHT ALLYLAMINE POLYMER OR ADDITION SALT THEREOF

(75) Inventors: Tadashi Kato, Koriyama (JP); Tadao Endo, Koriyama (JP); Minoru Takeuchi, Koriyama (JP); Mitsumasa Hashimoto, Nihonmatsu (JP); Yasuhiro Fujita, Koriyama (JP); Ikuo Hayashi, Koriyama (JP)

(73) Assignee: Nitto Boseki Co., Ltd., Fukushima-ken (JP)

( * ) Notice: Subject to any disclaimer, the term of this patent is extended or adjusted under 35 U.S.C. 154(b) by 0 days.

(21) Appl. No.: 09/548,265

(22) Filed: Apr. 12, 2000

(30) Foreign Application Priority Data

Oct. 13, 1997 (JP) .............................. 9-278855

(51) Int. Cl.[7] .................................. C08J 3/28
(52) U.S. Cl. ...................... 523/300; 523/160
(58) Field of Search .................. 523/300, 160

(56) References Cited

U.S. PATENT DOCUMENTS

| | | | | |
|---|---|---|---|---|
| 4,559,391 A | * | 12/1985 | Ueda et al. | 525/366 |
| 6,100,315 A | * | 8/2000 | Kitamura et al. | 523/160 |
| 6,180,754 B1 | * | 1/2001 | Stutts et al. | 528/422 |
| 6,268,452 B1 | * | 7/2001 | Kato et al. | 526/310 |
| 6,395,849 B1 | * | 5/2002 | Kato et al. | 526/219.5 |

FOREIGN PATENT DOCUMENTS

| | | | |
|---|---|---|---|
| JP | 53-88672 A | 8/1978 | |
| JP | 58-201811 A | 11/1983 | |
| JP | 62-119280 A | 5/1987 | |
| JP | 6-2780 B | 7/1987 | |
| JP | 63-33484 A | 2/1988 | |
| JP | 63-286405 A | 11/1988 | |
| JP | 2-255876 A | 10/1990 | |
| JP | 3-188174 A | 8/1991 | |
| JP | 5-195450 A | 8/1993 | |
| JP | 7-68298 B | 7/1995 | |
| JP | 8-113743 A | 5/1996 | |
| WO | WO99/21901 | * | 6/1999 |

* cited by examiner

Primary Examiner—Joseph D. Anthony
(74) Attorney, Agent, or Firm—Nixon & Vanderhye P.C.

(57) ABSTRACT

Disclosed are a process for the production of a low-molecular-weight allylamine polymer having a weight average molecular weight of 250 to 4,000 or an addition salt thereof, which comprises distilling a low-molecular-weight allylamine polymer solution to distill off unreacted monoallylamine, then, subjecting a residue to electrodialysis, and optionally carrying out acid treatment, a low-molecular-weight allylamine polymer having an ignition residue content of 5% by weight or less and a weight average molecular weight of 250 to 4,000, or an addition salt of a low-molecular-weight allylamine polymer having said properties, a water-resistance-imparting agent for use in an ink which comprises the above polymer or addition salt, and an ink composition comprising a colorant and the above water-resistance-imparting agent.

According to the process of the present invention, a low-molecular-weight allylamine polymer improved in coloring and almost free of an inorganic salt or an addition salt thereof can be efficiently obtained. Further, the ink composition comprising the low-molecular-weight allylamine polymer or the salt thereof, provided by the present invention, not only has high water resistance but also is excellent in shelf life, and it is suitably used for inkjet recording.

3 Claims, 1 Drawing Sheet

FIG. 1

PROCESS FOR THE PRODUCTION OF LOW-MOLECULAR-WEIGHT ALLYLAMINE POLYMER OR ADDITION SALT THEREOF

TECHNICAL FIELD

The present invention relates to (1) a process for the production of a low-molecular-weight allylamine polymer or an addition salt thereof, (2) a low-molecular-weight allylamine polymer or an addition salt thereof, (3) a water-resistance-imparting agent for use in an ink, which contains the same, and (4) an ink composition containing the above water-resistance-imparting agent. More specifically, it relates to (1) a process for efficiently and industrially advantageously producing a low-molecular-weight allylamine polymer or an addition salt thereof, which is improved in coloring, has little ignition residue content and is useful for use in various fields, (2) a low-molecular-weight allylamine polymer or an addition salt thereof, of which the ignition residue content, the unreacted monoallylamine content and the coloring are small or low and which is useful for various uses in the field of fine chemicals, (3) a water-resistance-imparting agent for use in an ink, which contains a low-molecular-weight allylamine polymer or its addition salt having the above properties and which is suitable for use in an inkjet recording ink, and (4) an ink composition, particularly an inkjet recording ink composition, which contains the above water-resistance-imparting agent and is excellent in water resistance and shelf life.

TECHNICAL BACKGROUND

It is hitherto known that allylamine does not easily undergo polymerization due to degradative chain transfer, and there is not much that is known concerning any effective method for producing an allylamine polymer. As a general method of producing an allylamine polymer or an addition salt thereof, there is known a method in which a monoallylamine addition salt is polymerized in water or a polar solvent in the presence of a radical polymerization initiator having a molecule containing an azo group and a cationic-nitrogen-possessing group at a temperature in the range of from 40 to 70° C., to obtain an addition salt of an allylamine polymer, and optionally, the so-obtained addition salt of an allylamine polymer is neutralized with an alkali (e.g., JP-A-58-201811). An allylamine polymer or an addition salt thereof obtained by the above method is relatively free from being colored, and is used in the fields of dye fixing agents, binders for paper making and additives to various chemicals.

On the other hand, in recent years, a low-molecular-weight allylamine polymer or an addition salt thereof is demanded in a variety of fields. When the radical polymerization initiator having a molecule containing an azo group and a cationic-nitrogen-possessing group is used as a radical polymerization initiator, however, it is required to use a large excess of an inorganic acid such as hydrochloric acid for producing a low-molecular-weight allylamine polymer or an addition salt thereof, as is described in JP-B-6-2780, so that there are involved problems that the removing of an excess of the inorganic acid is complicated and that a polymer solution obtained is liable to be colored.

Further, as another method of producing a low-molecular-weight allylamine polymer or an addition salt thereof, JP-A-5-195450 discloses a method in which an aqueous solution of an addition salt of a monoallylamine is provided and allowed to react in the presence of a large amount of a peroxide-based radical polymerization initiator at a high temperature.

In the above method, however, the radical polymerization initiator is used in a large amount and the polymerization is carried out under severe temperature conditions. There are therefore caused problems that an aqueous solution of an obtained low-molecular-weight allylamine polymer or addition salt thereof is inevitably colored in brown or the like, and that the coloring is liable to proceed with the passage of time.

Further, when a solution prepared by polymerization according to the above method is treated with activated carbon for overcoming the above coloring, procedures of removing the activated carbon by filtration are required. Moreover, a fine powder of the activated carbon is liable to be contained in the end polymer during the filtration, and it sometimes causes a problem in some use.

As a printer, a dot impact printer, a laser printer, a thermal printer, an inkjet printer, etc., are known. Of these, an inkjet printer is widely used in recent years due to characteristic features such as fast printing with a low noise, a low printing cost, downsizing and weight-decreasing feasibility based on a simple mechanism, an easiness in multi-color printing and image size increasing, non-necessity of development and fixing and adaptability of a record pattern.

In the above inkjet printer, conventionally, recording is carried out by an inkjet recording method in which an ink blob is generated and ejected by an electrostatic suction method, an air compression method, a method using electric deformation of a piezoelectric element or a method using a pressure caused by heat-blowing, and further, the ink blob is allowed to adhere to a recording paper. As an ink for use with the above recording method, generally, there is used a water-based ink prepared by dissolving or dispersing a colorant such as a dye or a pigment in water, a water-soluble organic solvent or a mixture of these.

In recent years, inkjet recording is required to satisfy water resistance on an ordinary paper, and as a water-based ink composition for attaining the above requirement, combinations of polyethyleneimine and polyamlines mainly including modified products thereof with dyes have been studied in various ways.

For example, there have been proposed (1) a water-fast inkjet composition comprising a hydroxyethylated polyethyleneimine and a dye component (JP-A-62-119280), (2) a water-resistant water-based ink composition comprising a polyamine having a molecular weight of at least 300 and having primary amino groups, an anionic dye, a stabilizer and a wetting agent (JP-A-2-255876 and JP-A-3-188174) and (3) a water-based ink comprising a specific anionic dye and amino acid type polyamine or polyethyleneimine (JP-A-8-113743).

However, the inkjet composition in the above (1) has a problem that since polyethyleneimine contains hydroxyethyl groups and hydrophilic nature increases depending upon the degree of a content thereof, so that water resistance decreases. The water-based ink composition in the above (2) involves a problem that a shelf life is poor since polyethyleneimine specifically described in Example highly possibly attacks an anionic dye. Further, the water-based ink in the above (3) has a problem that it is required to select a dye suitable for imparting water resistance from an anionic metal-containing dye, a metal-free dye having an anionic group and an azo group in specific positions or a metal-free azo dye having an aromatic ring, which limits dye selection to a narrow range, so that it is difficult to prepare an ink having a desired hue and a desired color density.

On the other hand, attempts have been made to use an allylamine polymer as a water-resistance-imparting agent in an ink composition. In this case, however, there are required complicated procedures of reacting an allylamine hydrochloride polymer with a dye (dye containing acid salt such as sulfonic acid salt, etc.) to prepare a dye containing an allylamine polymer as a counter cation and removing an inorganic salt, etc., by isolating it as a solid before use, as is described in JP-A-63-33484. Further, for avoiding the above complicated procedures, an allylamine polymer is converted to a free polymer in advance, and further, an inorganic salt, etc., are removed. Even in this case, when the allylamine polymer is used in an ink, the ink is liable to cause aggregation, which causes a problem in use.

DISCLOSURE OF THE INVENTION

Under the circumstances, a first object of the present invention is to provide a process for efficiently and industrially advantageously producing a low-molecular-weight allylamine polymer or its addition salt, which is improved in coloring, has little ignition residue content and is useful for various fields.

A second object of the present invention is to provide a low-molecular-weight allylamine polymer or its addition salt, which has a high quality and is useful for various uses in the field of fine chemicals.

Further, a third object of the present invention is to provide a novel water-resistance-imparting agent for use in an ink, which is suitable for use in an inkjet recording ink, and a fourth object of the present invention is to provide an ink composition, particularly an inkjet recording ink composition, which contains the above water-resistance-imparting agent and is excellent in water resistance and shelf life.

For achieving the above objects, the present inventors have made diligent studies and as a result, have found that the first object can be accomplished by distilling a low-molecular-weight allylamine polymer solution containing an unreacted monoallylamine and salt to distill off the unreacted monoallylamine, then subjecting the residue to electrodialysis, and optionally, further carrying out acid treatment.

Further, it has been found that a low-molecular-weight allylamine polymer having an ignition residue content equivalent to, or lower than, a specific value, having a weight average molecular weight in a specific range and preferably having an unreacted monoallylamine content and an absorbance, measured by a certain method, which are equivalent to, or smaller than, specific values, or an addition salt of a low-molecular-weight allylamine polymer having the above properties can meet the second object, that a water-resistance-imparting agent containing a low-molecular-weight allylamine polymer having the above properties or an addition salt thereof can meet the third object, and further that an ink composition comprising a low-molecular-weight allylamine polymer having the above properties or an addition salt thereof can meet the fourth in object.

The present invention has been made on the basis of the above findings.

That is, the first object of the present invention is achieved by a process for the production of a low-molecular-weight allylamine polymer having a weight average molecular weight of 250 to 4,000 or an addition salt thereof, which comprises distilling a low-molecular-weight allylamine polymer solution containing an unreacted monoallylamine and a salt, thereby distilling off the unreacted monoallylamine, then, subjecting a residue to electrodialysis, and optionally carrying out acid treatment.

Further, the second object of the present invention is achieved by a low-molecular-weight allylamine polymer having an ignition residue content of 5% by weight or less and a weight average molecular weight of 250 to 4,000, or an addition salt of a low-molecular-weight allylamine polymer having the above properties.

Furthermore, the third object of the present invention is achieved by a water-resistance-imparting agent for an ink, comprising a low-molecular-weight allylamine polymer having an ignition residue content of 5% by weight or less and a weight average molecular weight of 250 to 4,000, or an addition salt of a low-molecular-weight allylamine polymer having the above properties.

Moreover, the fourth object of the present invention is achieved by an ink composition comprising (A) a colorant and (B) a water-resistance-imparting agent containing a low-molecular-weight allylamine polymer having an ignition residue content of 5% by weight or less and a weight average molecular weight of 250 to 4,000, or an addition salt of a low-molecular-weight allylamine polymer having the above properties.

BEST MODES FOR PRACTICING THE INVENTION

The process for the production of a low-molecular-weight allylamine polymer or an addition salt thereof, provided by the present invention, will be explained first.

The low-molecular-weight allylamine polymer produced by the process of the present invention is a polymer mainly containing a recurring unit of the formula (I).

The low-molecular-weight allylamine polymer solution containing an unreacted monoallylamine and a salt, used as a starting material in the process of the present invention, is preferably a product obtained by polymerizing an addition salt of monoallylamine in water or a polar solvent under low polymerization degree conditions and neutralizing a polymerization solution, although the starting material shall not be limited thereto.

The addition salt of monoallylamine used as a starting monomer is generally an inorganic acid salt of monoallylamine. Examples of such an addition salt include hydrochloride, sulfate, phosphate, perchlorate and nitrate of monoallylamine. An organic acid salt such as acetate may be used.

As a polymerization medium, water or a polar solvent is used. Examples of the polar solvent include inorganic acids such as hydrochloric acid, sulfuric acid, phosphoric acid and polyphosphoric acid or aqueous solutions thereof, organic acids such as formic acid, acetic acid, propionic acid and lactic acid or aqueous solutions thereof, alcohols, dimethylsulfoxide, dimethylformamide, further, aqueous solutions of inorganic salts such as zinc chloride, calcium chloride and magnesium chloride.

The addition salt of monoallylamine is generally used in the form of an insolated crystal, while monoallylamine and an acid may be added to the above water or polar solvent to form the addition salt in a system thereof. When an acid or an aqueous solution thereof is used as a polymerization medium, naturally, a predetermined amount of monoallylamine may be added to the acid or the aqueous solution thereof to carry out polymerization in situ.

The monoallylamine concentration in the polymerization medium for the polymerization is not critical, and it is determined as required depending upon the type of the radical polymerization initiator. For example, when a peroxide radical polymerization initiator is used, the monomer concentration is generally 10 to 80% by weight, preferably 20 to 70% by weight. When the monoallylamine concentration is low, an allylamine polymer having a low molecular weight can be easily obtained, while the polymerization rate is liable to be low. On the other hand, when the monoallylamine concentration is too high, the polymerization rate is high, while an allylamine polymer is liable to have a high molecular weight.

As a radical polymerization initiator for polymerization under low polymerization degree conditions, there can be used a known peroxide radical polymerization initiator or a radical polymerization initiator having an azo group and cationic nitrogens. Examples of the peroxide radical polymerization initiator include ammonium persulfate, sodium persulfate, potassium persulfate and hydrogen peroxide. Examples of the radical polymerization initiator having an azo group and cationic nitrogen include azobis(2-amidinopropane)dihydrochloride and azobis(2-imidazolinylpropane)dihydrochloride. Of the above radical polymerization initiators, the peroxide radical polymerization initiators are particularly preferred in view of the formation of an allylamine polymer having a lower molecular weight and an improvement in polymerization rate.

The above radical polymerization initiators may be used alone or in combination. Further, it is required to use the radical polymerization initiator in a larger amount than an amount of the same used for general polymerizations. The amount there of based on the addition salt of monoallylamine is generally at least 1.5% by weight, preferably 5 to 75% by weight, more preferably 10 to 50% by weight. Generally, when the amount of the radical polymerization initiator is small, undesirably, the polymerization rate is low and the molecular weight is high.

When the addition salt of monoallylamine is polymerized in water or a polar solvent under low polymerization degree conditions, the polymerization can be carried out at a low monomer concentration in a polymerization system and at a high polymerization temperature. Further, the polymerization yield can be increased at a high concentration of the radical polymerization initiator.

It is required to set the polymerization temperature at a temperature higher than a temperature employed for a process for the production of a general allylamine polymer. The polymerization temperature is generally from 75° C. to a reflux temperature, preferably from 80 to 100° C. When the polymerization temperature is too low, the polymerization rate is low, and the molecular weight is liable to be high. The length of the polymerization time differs depending upon the kind of a radical polymerization initiator used and a polymerization temperature and cannot be uniformly determined. When a peroxide radical polymerization initiator is used, generally, the length of the polymerization time is at least 1 hour.

Since the polymerization is carried out under such severe conditions, a solution obtained immediately after completion of the polymerization, i.e., a solution of the addition salt of a low-molecular-weight allylamine polymer is colored in brown, and the coloring thereof is liable to proceed with the passage of time.

In the polymerization solution after the completion of polymerization, the low-molecular-weight allylamine polymer is present in a state of an addition salt. Even if the solution is directly subjected to electrodialysis using an ion exchange membrane as described in JP-B-7-68298, the coloration is difficult to overcome.

In the production of the starting material for use in the present invention, therefore, the above polymerization solution is neutralized with an alkali. Preferably, the neutralization treatment is carried out to such an extent that the addition salt of a low-molecular-weight allylamine polymer is brought into a free state, i.e., such that the polymerization solution after the tin neutralization comes to have a pH in the range of, generally, from 9 to 13.5, preferably from 10 to 13. The alkali used for the neutralization treatment is not critical, and preferably, it can be selected, for example, from hydroxides of alkali metals such as sodium hydroxide, potassium hydroxide and lithium hydroxide. In the neutralization treatment, an acid freed from the polyallylamine reacts with the alkali to form a salt.

In the above manner, the low-molecular-weight allylamine polymer solution as a starting material can be obtained, while the low-molecular-weight allylamine polymer contains an unreacted monoallylamine and the salt. In the present invention, therefore, the low-molecular-weight allylamine polymer is distilled to distill off the unreacted monoallylamine. The distillation is preferably carried out under reduced pressure, it is more preferably carried out under conditions including a temperature of 40 to 100° C. and a vacuum degree of 10 to 300 mmHg, and it is particularly preferably carried out under conditions including a temperature of 50 to 80° C. and a vacuum degree of 20 to 200 mmHg. Under the above conditions, the low-molecular-weight allylamine polymer remains without being distilled off.

In the process of the present invention, a residual liquid remaining after the unreacted monoallylamine is distilled off is subjected to electrodialysis. Since the solvent such as water is partially distilled off when the monoallylamine is distilled off, the residue may be diluted with a solvent before it is subjected to electrodialysis. The electrodialysis is preferably carried out with an ion exchange membrane.

In the present invention, in the above electrodialysis using an ion exchange membrane, almost all of the low-molecular-weight allylamine polymer as an end product remains without being removed. Further, not only the low-molecular-weight allylamine polymer solution is improved in coloring to a great extent, but also impurities derived from the polymerization initiator used for the polymerization and the salt formed by the neturalization can be also removed together.

A mode of practice of the electrodialysis using an ion exchange membrane will be explained with reference to attached drawings.

Figure 1:
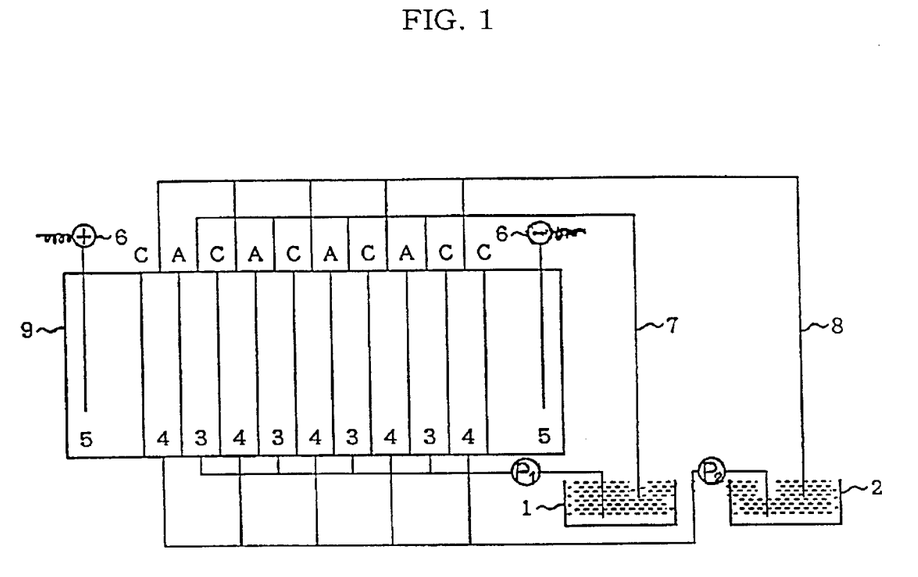
FIG. 1 is a schematic view of one example of an electrodialyzer for use in the process for the production of a low-molecular-weight allylamine polymer or an addition salt thereof, provided by the present invention. In Figure, reference numeral 1 shows a starting liquid vessel, 2 shows a concentrated liquid vessel, 3 shows a dilution chamber, 4 shows a concentration chamber, 5 shows an electrode chamber, 6 shows an electrode plate, 7 shows a starting liquid line, 8 shows a concentrated liquid line, 9 shows an electric vessel, $P_1$ and $P_2$ show pumps, respectively, A is an anion exchange membrane, and C shows a cation exchange membrane.

FIG. 1 is a schematic view of one example of an electrodializer for use in the present invention. An electric vessel 9 has cation exchange membranes C and anion exchange membranes A which are arranged alternately in parallel with one another, and it is constituted of dilution chambers 3, concentration chambers 4 and electrode chambers 5 which are partitioned with the membranes. Electrode chambers 5 on both ends of the electric vessel 9 are provided with an anode or cathode electrode plate 6. A starting liquid (polymerization solution after the monomer is distilled off) charged into a starting liquid vessel 1 is sent to the dilution chambers 3 of the electric vessel 9 with a pump $P_1$. Then, coloring components, etc., move to the concentration chambers 4 through the cation exchange membranes C or the anion exchange membranes A. During the movement, the low-molecular-weight allylamine polymer is blocked with each cation exchange membrane C and therefore remains in the dilution chambers 3, and as it is, it remains in a state where it is improved in coloring. On the other hand, an electrolyte which is a concentrated liquid is charged into the concentrated liquid vessel 2 and the electrode chambers 5. The concentrated liquid is sent to the concentration chamber 4 with a pump $P_2$.

Specifically, the starting liquid, the concentrated liquid and an electrode liquid are recycled to the dilution chambers 3, the concentration chambers 4 and the electrode chambers 5, respectively, and DC voltage is applied between the electrode plates 6, whereby the coloring components, etc., are gradually removed from the starting liquid in the starting liquid vessel 1 by dialysis, and the coloring components, etc., dialyzed in the concentrated liquid is concentrated in the concentrated liquid vessel 2. As a result, a polymer solution improved in coloring degree comes to be stored in the starting liquid vessel 1, and the coloring components, etc., come to be concentrated and stored in the concentrated liquid vessel 2. In this case, impurities derived from a neutralization salt or the initiator are concentrated and stored in the concentrated liquid vessel 2 together. In this manner, there can be obtained an allylamine polymer which is improved in coloring and from which impurities derived from the neutralization salt or the initiator are removed. In addition, 7 shows a starting liquid line, and 8 shows a concentrated liquid line.

The cation exchange membrane and the anion exchange membrane used in the present invention can be general ion exchange membranes (e.g., CMV, AMV, etc., supplied by Asahi Glass Co., Ltd.), and it is not necessary to use any special ion exchange membranes. Further, the electrodialysis vessel in which these ion exchange membranes are fitted can be also selected from commercially available ones, and it is not necessary to particularly determine the membrane/membrane distance or the number of the chambers.

In the electrodialysis using ion exchange membranes, employed in the present invention, when the dialysis is continued for a long period of time or when the dialysis is repeated many times, it is sometimes difficult to improve the low-molecular-weight allylamine polymer in coloring even if the electrodialysis using the ion exchange membranes is further carried out.

When a cationic polymer such as an allylamine polymer is subjected to electrodialysis using an ion exchange membrane, the contamination (fouling) of the ion exchange membrane takes place in almost no case. However, it has been found by the present inventors that such a phenomenon is caused by the unexpected contamination of the ion exchange membrane when the electrodialysis using the ion exchange membrane is continued for a long period of time in the present invention.

The above phenomenon substantially does not take place in the case of a high-molecular-weight allylamine polymer having a molecular weight of approximately 10,000 as described in JP-B-7-68298. It is characteristic of the dialysis of a low-molecular-weight allylamine polymer with an ion exchange membrane.

As disclosed in JP-A-53-88672, it is known that some kind of organic ion causes the above contamination (fouling) of an ion exchange membrane. Generally, however, it is an anion exchange membrane that is contaminated by electrodialysis using an ion exchange membrane. Interestingly, a cation exchange membrane comes to be contaminated in the present invention. That is because a low-molecular-weight allylamine polymer having a lower polymerization degree, of the low-molecular-weight allylamine polymer solution, adheres to the membrane.

In almost no case, backward electric application is effective as measures against the contamination of an ion exchange membrane for a cationic polymer. However, the present inventors have found that the membrane contamination can be overcome by effecting backward electric application as measures against the membrane contamination. The above "backward electric application" refers to causing an electric current to flow in a direction opposite to the direction in which the current flows during the generation of the contamination, for restoring the performance of an ion exchange membrane when the ion exchange membrane is contaminated by substances that can hardly permeate in the electrodialysis using an ion exchange membrane. For carrying out the backward electric application, electrolytes are charged into the concentrated liquid vessel and the starting liquid vessel.

The pH of the electrolyte used in the concentrated liquid vessel is preferably 7.2 to 13.5, more preferably 8 to 13, particularly preferably 9 to 12.5. When the pH is less than 7.5, it is difficult to recover the membrane from contamination. When the pH exceeds 13.5, the membrane is liable to be destroyed. The above alkaline pH range is preferred for the electrolyte, presumably because it is required to bring a membrane contaminant into a free state for removing the contaminant since the contaminant adheres to the membrane while the contaminant is in the state of a cation.

As an electrolyte for use in the concentrated liquid vessel, for example, there can be used an electrolyte prepared by adding an alkali to an inorganic aqueous solution so that the inorganic salt aqueous solution is adjusted to have the above pH. The inorganic salt for use in the electrolyte can be selected, for example, from sodium chloride or sodium bromide, and the alkali for pH adjustment can be selected, for example, from sodium hydroxide or potassium hydroxide. The electrolyte generally has an inorganic salt concentration of 1 to 20% by weight, preferably 2 to 15% by weight.

When the backward electric application is carried out, an inorganic salt aqueous solution having a concentration of approximately 0.5 to 5% by weight can be used as an electrolyte for use in the starting liquid vessel. The inorganic salt therefor can be selected, for example, from sodium chloride or sodium bromide.

In the present invention, when the procedure of the backward electric application is added, a low-molecularweight allylamine polymer solution having a low coloring degree can be industrially advantageously produced without replacing ion exchange membranes.

In the present invention, the thus-obtained low-molecular-weight allylamine polymer solution can be adjusted so as to have an ignition residue content of 5% by weight or less based on the allylamine polymer together with an improvement in coloring. The "ignition residue content" refers to a value obtained by combusting an allylamine polymer solution at 650° C. for 2.5 hours and then measuring a residue for an amount.

The low-molecular-weight allylamine polymer obtained according to the process of the present invention has a weight average molecular weight in the range of from 250 to 4,000. The problem of coloring is likely to take place when a low-molecular-weight allylamine polymer having a weight average molecular weight of 250 to 2,500 is produced. It is therefore particularly advantageous to apply the process of the present invention to a solution of a low-molecular-weight allylamine polymer having a weight average molecular weight in the above range. The "weight average molecular weight" refers to a value measured by gel permeation chromatography using polyethylene oxide as a reference substance.

The low-molecular-weight allylamine polymer obtained according to the process of the present invention is colored to a least degree, and as an index therefor, when an aqueous solution containing hydrochloride of the allylamine polymer having a concentration of 3% by weight is prepared and measured for an absorbance at a wavelength of 480 nm, the absorbance can be 0.12 or less, preferably 0.1 or less.

In the thus-produced low-molecular-weight allylamine polymer, the molecular weight, the ignition residue content and the coloring degree are as described above. Generally, the low-molecular-weight allylamine polymer can be also produced as an allylamine polymer having a residual monomer content of as small as 250 ppm by weight based on the allylamine polymer.

The low-molecular-weight allylamine polymer produced according to the process of the present invention is improved in coloring, and at the same time, it does not easily undergo any further coloring.

It is thought that it is because coloring components, etc., can be removed by the electrodialysis since most of the coloring components have low molecular weights that the present invention improves the low-molecular-weight allylamine polymer in coloring.

When an addition salt of an allylamine polymer is produced according to the present invention, the addition salt can be produced by adding a proper amount, e.g., an equivalent weight equivalent to monomer units of the allylamine polymer, of an acid to the allylamine polymer solution treated by electrodialysis using an ion exchange membrane. The acid can be selected, for example, from hydrochloric acid, sulfuric acid, hydrobromic acid, nitric acid or acetic acid. The above addition salt of the allylamine polymer is also obtained as a product improved in coloring.

The low-molecular-weight allylamine polymer or the addition salt thereof, provided by the present invention, will be explained hereinafter.

The low-molecular-weight allylamine polymer of the present invention has an ignition residue content of 5% by weight or less and has a weight average molecular weight in the range of from 250 to 4,000, preferably from 250 to 2,500.

Further, the low-molecular-weight allylamine polymer preferably has an unreacted monoallylamine content of 250 ppm by weight or less, and it has an absorbance of 0.12 or less, particularly preferably 0.10 or less, when measured for an absorbance at a wavelength of 480 nm in a hydrochloride aqueous solution having a concentration of 3% by weight thereof.

The addition salt of a low-molecular-weight allylamine polymer, provided by the present invention, is obtained by adding an acid such as hydrochloric acid, nitric acid, acetic acid or the like to a low-molecular-weight allylamine polymer having the above properties.

The process for producing the low-molecular-weight allylamine polymer of the present invention can be any process so long as a low-molecular-weight allylamine polymer having the above properties can be obtained, and it is not specially limited. According to the above process of the present invention, the low-molecular-weight allylamine polymer of the present invention can be remarkably effectively produced. And, the addition salt of a low-molecular-weight allylamine polymer, provided by the present invention, can be produced by adding a proper amount, e.g., an equivalent weight equivalent to monomer units of an allylamine polymer, of hydrochloric acid, nitric acid, acetic acid or the like to the allylamine polymer solution having the above properties.

The low-molecular-weight allylamine polymer or the addition salt thereof, provided by the present invention, can be suitably used in fields where coloring is undesirable or in fields where the inorganic salt or the residual monomer is undesirable.

The water-resistance-imparting agent for use in an ink and the ink composition, provided by the present invention, will be explained.

The water-resistance-imparting agent for use in an ink, provided by the present invention, contains a low-molecular-weight allylamine polymer having the above properties or an addition salt thereof, and it is particularly preferably used in an inkjet recording ink.

Further, the ink composition of the present invention contains (A) a colorant and (B) the water-resistance-imparting agent containing a low-molecular-weight allylamine polymer having the above properties or an addition salt thereof, and it is particularly preferably used for an inkjet recording.

In the above ink composition, the colorant as component (A) is not critical, and it can be properly selected, as required, from colorants which are conventionally used in water-based inks. The present invention aims at an improvement in water resistance, so that a water-soluble dye such as a direct dye, an acidic dye, a basic dye, a reactive dye or an edible dyestuff can be particularly preferably used. Examples of the water-soluble dye which satisfies clearness, water solubility, stability, light resistance and other required performances include C.I. Direct Black 17, 19, 32, 51, 71, 108, 146, 154 and 168; C.I. Direct Blue 6, 22, 25, 71, 86, 90, 106 and 199; C.I. Direct Red 1, 4, 17, 28, 83 and 227; C.I. Direct Yellow 12, 24, 26, 86, 98 and 142; C.I. Direct Orange 34, 39, 44, 46 and 60; C.I. Direct Violet 47 and 48; C.I. Direct Brown 109; C.I. Direct Green 59; C.I. Acid Black 2, 7, 24, 26, 31, 52, 63, 112 and 118; C.I. Acid Blue 9, 22, 40, 59, 93, 102, 104, 117, 120, 167, 229 and 234; C.I. Acid Red 1, 6, 32, 37, 51, 52, 80, 85, 87, 92, 94, 115, 180, 249, 256, 289, 315 and 317; C.I. Acid yellow 11, 17, 23, 25, 29, 42, 61 and 71; C.I. Acid Orange 7 and 19; C.I. Acid Violet 49; C.I. Basic Black 2; C.I. Basic Blue 1, 3, 5, 7, 9, 24, 25, 26, 28 and 29; C.I. Basic Red 1, 2, 9, 12, 13, 14 and 37; Basic Violet 7, 14 and 27; and C.I. Food Black 1 and 2. These colorants may be used alone or in combination.

In the ink composition of the present invention, generally, water or a mixture of water with a water-soluble organic solvent is used as a solvent. The water can be selected, for example, from pure water or ultrapure water such as deionized water, ultrafiltration water, reverse osmosis water or distilled water. Further, it is preferred to use water sterilized by irradiation with ultraviolet light or adding hydrogen peroxide, since the occurrence of mold and bacteria can be prevented when the ink composition is stored for a long period of time.

Examples of the water-soluble organic solvent include alkylene glycols such as ethylene glycol, triethylene glycol, tetraethylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol and 1,2,3-hexanetriol, polyalkylene glycols such as polyethylene glycol and polypropylene glycol, glycerols such as glycerol, diglycerol and triglycerol, lower alkyl ethers of glycols such as ethylene glycol monomethyl ether, ethylene glycol monoethyl ether, diethylene glycol monomethyl ether, diethylene glycol monoethyl ether and diethylene glycol mono-n-butyl ether, thiodiethanol, N-methyl-2-pyrrolidone, and 1,3-dimethyl-2-imidazolidinone. These may be used alone or in combination. Further, in combination with the above, there may be used a water-soluble solvent selected from alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol and benzyl alcohol, amides such as dimethylformamide and diethylacetamide, and ketones such as acetone. The mixing ratio of water and the above water-soluble organic solvent is not critical, and it can be determined as required.

In the ink composition of the present invention, the content of the colorant as component (A) is generally 0.1 to 20% by weight, preferably 0.5 to 10% by weight. When the content of the colorant is less than 0.1% by weight, no sufficient optical density can be imparted to a recorded product. when it exceeds 20% by weight, the optical density is not further improved for such a content, and it rather causes a decrease in the drying rate of the ink composition on a paper surface.

The content of the water-resistance-imparting agent as component (B) in terms of a free low-molecular-weight allylamine polymer is generally 0.5 to 30% by weight, preferably 1 to 20% by weight. When the above content is less than 0.5% by weight, no sufficient effect on imparting water resistance is exhibited. When it exceeds 30% by weight, undesirably, the viscosity of the ink composition is too high.

The ink composition of the present invention may contain known additives such as a water-resistance-imparting agent including other cationic polymer, a surface tension adjusting agent, a viscosity adjusting agent, a surfactant, a stabilizer for a cationic polymer, a fluorescence brightener, a fungicide, an rust preventive and an antiseptic.

The ink composition of the present invention is excellent in water resistance, and further, it is also excellent in shelf life since its discoloration and aggregation are inhibited.

The present invention will be explained further in detail with reference to Examples hereinafter, while the present invention shall not be limited by these Examples.

EXAMPLE 1

Preparation of Low-molecular-weight Allylamine Polymer Improved in Coloring and Hydrochloride thereof An aqueous solution containing 2.62 kg of ammonium persulfate and 4.9 kg of water was added to 22.6 kg of an aqueous solution having a monoallylamine hydrochloride concentration of 58% by weight, and the resultant mixture was allowed to undergo polymerization at 82 to 92° C. for 3 hours, to give a brown aqueous solution having a concentration of 46.6% by weight of a hydrochloride of a low-molecular-weight allylamine polymer. The above aqueous solution was diluted to prepare an aqueous solution having a concentration of 3% by weight of the hydrochloride of the low-molecular-weight allylamine polymer, and it was used as an aqueous solution of hydrochloride of a low-molecular-weight allylamine polymer in Comparative Example 1. The above hydrochloride of the low-molecular-weight allylamine polymer was measured for a polymerization rate by GPC to show 93%, and it was measured for a weight average molecular weight by GPC using polyethylene oxide as a reference substance, to show 837 as a free low-molecular-weight allylamine polymer.

The above molecular weight measurement used, as a GPC column, a column prepared by connecting Asahi Pack water-based gel filter types GS-220 (exclusion limit molecular weight 3,000) and GS-620HQ (exclusion limit molecular weight 2,000,000) in series, and as a column elution solvent, a 0.4 mol/liter sodium chloride aqueous solution was used.

Further, the aqueous solution having a concentration of 3% by weight of the hydrochloride of the low-molecular-weight allylamine polymer in Comparative Example 1 was measured for an absorbance at 480 nm, to show 0.183.

Then, 1.42 kg of a sodium hydroxide aqueous solution having a concentration of 49% by weight was added to, and mixed with, 3.22 kg of the above aqueous solution having a concentration of 46.5% by weight of a hydrochloride of a low-molecular-weight allylamine polymer to neutralize the aqueous solution. The neutralized aqueous solution had a pH of 12. The thus-prepared low-molecular-weight allylamine polymer containing unreacted monoallylamine and sodium chloride was used as a starting material.

The above-obtained starting material was distilled under reduced pressure at 60° C. at 80 mmHg, to distill off the unreacted monoallylamine. Further, the remaining solution was diluted with water, to give a low-molecular-weight allylamine polymer aqueous solution having a concentration of 18.4% by weight. Part of the aqueous solution was combusted at 650° C. for 2.5 hours for measuring an ignition residue content, to show 156% by weight based on the low-molecular-weight allylamine polymer.

Further, 4.0 kg of the above low-molecular-weight allylamine polymer aqueous solution having a concentration of 18.4% by weight was diluted with water to adjust the concentration into 11.2% by weight, and the diluted aqueous solution was subjected to electrodialysis using ion exchange membranes (DU-0b model supplied by Nippon Rensui K.K. was used as an electrodializer, 12 sheets of CMV supplied by Asahi Glass Co., Ltd. were used as cation exchange membranes, and 11 sheets of AMV supplied by Asahi Glass Co., Ltd. were used as anion exchange membranes). Concerning dialysis conditions, a concentrated liquid vessel was charged with 4 liters of a 1 wt % sodium chloride aqueous solution, and a starting liquid vessel was charged with the above demonomerized polymer aqueous solution having a concentration of 11.2% by weight. While these solutions were circulated at a flow rate of approximately 125 liters/hour, a DC volt of 13.5 V was applied between the electrodes. Under the above conditions, electrodialysis using ion exchange membranes was carried out for 12 hours, to give 4.65 kg (recovery ratio 96%) of an allylamine polymer aqueous solution having a concentration of 15.2% by weight.

Part of the above-obtained allylamine polymer aqueous solution was combusted in an oven at 650° C. for 2.5 hours, to show 4.5% by weight based on the allylamine polymer. Hydrochloric acid in an equimolar amount based on monomer units was added to the above allylamine polymer aqueous solution, and the mixture was diluted with water, to prepare an aqueous solution having a concentration of 3% by weight of hydrochloride of the allylamine polymer. This aqueous solution was used as an aqueous solution of hydrochloride of a low-molecular-weight allylamine polymer in Example 1. The above aqueous solution of hydrochloride of a low-molecular-weight allylamine polymer in Example 1 was measured for an absorbance at a wavelength of 480 nm, to show 0.093, and was therefore found to be greatly improved in coloring as compared with the counterpart in Comparative Example 1.

EXAMPLE 2

Shelf Life of Hydrochloride of Low-molecular-weight Allylamine Polymer

The aqueous solution of hydrochloride of the low-molecular-weight allylamine polymer in Example 1 or comparative Example 1 was hermetically closed and stored at approximately 25° C. After 16 days, the aqueous solution of hydrochloride of the low-molecular-weight allylamine polymer in Example 1 or Comparative Example 1 showed an increase in absorbance at a wavelength of 480 nm by 8.0% or 40.4% respectively, before storage. As a result, it was found that the aqueous solution of hydrochloride of the low-molecular-weight allylamine polymer prepared in Example 1 hardly caused coloring.

EXAMPLE 3

Restoration of Ion Exchange Membrane by Backward Electric Application

An aqueous solution containing 39.3 kg of ammonium persulfate and 73.5 kg of water was added to 339 kg of an aqueous solution having a monoallylamine hydrochloride concentration of 58% by weight, and the resultant mixture was allowed to undergo polymerization at 83 to 91° C. for 3 hours, to give a brown aqueous solution of hydrochloride of a low-molecular-weight allylamine polymer.

The above hydrochloride of a low-molecular-weight allylamine polymer was measured for a polymerization rate by GPC to show 94%, and measured for a weight average molecular weight by GPC using polyethylene oxide as a reference substance, to show 881 as a free low-molecular-weight allylamine polymer.

213 Kilograms of an aqueous solution having a sodium hydroxide concentration of 49% by weight was added to, and mixed with, the above aqueous solution of hydrochloride of the low-molecular-weight allylamine polymer, to neutralize it. The resultant neutralized mixture was treated at 60° C. under reduced pressure at 80 mmHg to remove the monomer and further diluted with water to give an aqueous solution having a low-molecular-weight allylamine polymer concentration of 9.5% by weight. A hydrochloric acid aqueous solution was added to part of the above aqueous solution to prepare an aqueous solution having a concentration of 3% by weight of hydrochloride of the low-molecular-weight allylamine polymer, and the thus-prepared aqueous solution was measured for an absorbance at 480 nm to show 0.187.

For improving the above aqueous solution having a low-molecular-weight allylamine polymer concentration of 9.5% by weight in coloring, the aqueous solution was divided into 240 kg of three portions each, and these portions were separately subjected to electrodialysis using ion exchange membranes. As an electrodializer, a DW-O model supplied by Nippon Rensui K.K. was used. As ion exchange membranes, ion exchange membranes having a membrane surface of 5.0 dm$^2$/pair (16 sheets of CMV supplied by Asahi Glass Co., Ltd. as cation exchange membranes and 15 sheets of AMV supplied by Asahi Glass Co., Ltd. as anion exchange membranes) were used. The applied voltage was set at 65 volts.

When a length of time period was measured until an ignition residue content of 5% by weight or less based on the allylamine polymer was attained, it was 62 hours in the first run as shown in Table 1. While the above-used ion exchange membranes were used as they were, the above divided aqueous solutions having a low-molecular-weight allylamine polymer concentration of 9.5% by weight were similarly subjected to electrodialysis using ion exchange membranes in the second and third runs. The length of the dialysis time period in the second run was 78 hours as shown in Table 1, and in the third run, an ignition residue content of 5% or less was not attained even in 90 hours. Absorbance data in Table 1 are values obtained by measuring prepared aqueous solution having a concentration of 3% by weight of hydrochloride of the low-molecular-weight allylamine polymer.

In the fourth run, backward electric application was carried out, and then electrodialysis using ion exchange membranes was carried out in the same manner as above. The backward electric application was carried out u as follows. The starting liquid vessel was charged with 40 liters of aqueous solution having a sodium chloride concentration of 1% by weight, and the concentrated liquid vessel was charged with 40 liters of a solution having a sodium chloride concentration of 5% by weight (adjusted to a pH of 10.5 with sodium hydroxide). DC voltage was applied reversely to usual application, to carry out backward electric application for 2 hours, whereby the membranes were recovered. As a result, the dialysis time period was decreased to 63 hours as shown in Table 1, and the efficiency of the electrodialysis was restored nearly to the level of the first run.

TABLE 1

| | Electrodialysis time (hour) | Ignition residue content (wt %) | Absorbance before dialysis | Absorbance after dialysis |
|---|---|---|---|---|
| 1st run | 62 | 4.6 | 0.187 | 0.087 |
| 2nd run | 78 | 4.8 | 0.190 | 0.089 |
| 3rd run | 90 | 15.1 | 0.192 | 0.123 |
| 4th run (after backward electric application) | 63 | 4.6 | 0.198 | 0.093 |

EXAMPLE 4

A low-molecular-weight allylamine polymer purified by the method in Example 1 was neutralized in an acetic acid aqueous solution to be adjusted to a pH of 7, whereby a purified low-molecular-weight allylamine polymer aqueous solution (0.02 mol/liter in terms of monomer units) was obtained. An aluminum lamina was placed in the aqueous solution and left at 60° C. to study when corrosion of the aluminum surface would start (corrosion day). As a result, the corrosion day was 13th day. For comparison, the aqueous solution of hydrochloride of the low-molecular-weight allylamine polymer in Comparative Example 1 was neutralized with a sodium hydroxide aqueous solution to be adjusted to a pH of 7, whereby an aqueous solution of a crude low-molecular-weight allylamine polymer (0.02 mol/liter in terms of monomer units) was obtained. The aqueous solution was similarly studied for a corrosion day to show 4th day. It has been found that the low-molecular-weight allylamine polymer produced according to the present invention is good for metal corrosion.

EXAMPLE 5

Stability in use as Water-resistance-imparting Agent

As dyes, three kinds of 4.7 g of an aqueous solution containing 10% by weight of C.I. Direct Blue 199, 6.6 g of an aqueous solution containing 8% by weight of C.I. Direct Yellow 86, and 5.4 g of an aqueous solution containing 8% by weight of C.I. Food Black 2 were used.

As an allylamine polymer for a water-resistance-imparting agent, the free allylamine polymer aqueous solution purified by electrodialysis (dialyzed low-molecular-weight PPA), obtained in Example 1, was used. The above aqueous solution had or showed an ignition residue content of 4.5% by weight based on the allylamine polymer, a remaining unreacted monoallylamline content of 18 ppm by weight based on the allylamine polymer, an absorbance of 0.093 at a wavelength of 480 nm in an aqueous solution having a concentration of 3% by weight of hydrochloride of the allylamine polymer and a weight average molecular weight of 837.

The above dye solutions in an amount of $5 \times 10^{-4}$ mol each were placed in test tubes, and of 0.5 ml ($5 \times 10^{-4}$ mol), 1.0 ml ($10^{-3}$ mol), 1.5 ml ($1.5 \times 10^{-3}$ mol), 2.0 ml ($2.0 \times 10^{-3}$ mol) or 3.0 ml ($3.0 \times 10^{-3}$ mol) of the allylamine polymer aqueous solution as the water-resistance-imparting agent was added to, and dissolved in, the dye solutions. Then, the test tubes were allowed to stand at room temperature for 1 week and visually evaluated for the presence or absence of a precipitate. Table 2 shows the results.

COMPARATIVE EXAMPLE 2

Stability in use as Water-resistance-imparting Agent

Example 5 was repeated except that the allylamine polymer as a water-resistance-imparting agent in Example 5 was replaced with a free allylamine polymer aqueous solution from which the unreacted monoallylamine polymer was removed in Example 1 but which was not subjected to the electrodialysis in Example 1 (non-dialyzed low-molecular-weight PAA). Table 2 shows the results.

The-above free allylamine polymer had or showed an ignition residue content of 156% by weight based on the allylamine polymer, a remaining unreacted monoallylamine content of 45.1 ppm by weight based on the allylamine polymer, an absorbance of 0.186 at a wavelength of 480 nm in an aqueous solution having a concentration of 3% by weight of hydrochloride of the allylamine polymer and a weight average molecular weight of 837.

COMPARATIVE EXAMPLE 3

Stability in use as Water-resistance-imparting Agent

Example 5 was repeated except that the allylamine polymer as a water-resistance-imparting agent in Example 5 was replaced with an aqueous solution of hydrochloride of an allylamine polymer which was not neutralized with sodium hydroxide in Example 1 (aqueous solution of hydrochloride of an allylamine polymer in Comparative Example 1, non-dialyzed low-molecular-weight PAA.HCl). Immediately after it was added to the dye solutions, it caused precipitates by aggregation. Table 2 shows the results.

The above hydrochloride of an allylamine polymer had or showed a remaining unreacted monoallylamine content of 7.5% by weight based on the allylamine polymer, an absorbance of 0.183 at a wavelength of 480 nm in an aqueous solution having a concentration of 3% by weight of hydrochloride of the allylamine polymer and a weight average molecular weight of 837 as a free allylamine polymer.

COMPARATIVE EXAMPLE 4

Stability in use as Water-resistance-imparting Agent

Example 5 was repeated except that the allylamine polymer as a water-resistance-imparting agent in Example 5 was replaced with a free allylamine polymer aqueous solution which was subjected to electrodialysis but had a weight average molecular weight of 10,000 (dialyzed high-molecular-weight PAA). Table 2 shows the results.

The above free allylamine polymer had or showed an ignition residue content of 4.5% by weight based on the allylamine polymer, a remaining unreacted monoallylamine content of 44.0 ppm by weight based on the allylamine polymer and an absorbance of 0.008 at a wavelength of 480 in an aqueous solution having a concentration of 3% by weight of hydrochloride of the allylamine polymer.

TABLE 2

| | Amount (ml) | Example 5 Dialyzed low-molecular-weight PAA | Comparative Example 2 Non-dialyzed low-molecular-weight PAA | Comparative Example 3 Non-dialyzed low-molecular-weight PAA•HCl | Comparative Example 4 Dialyzed high-molecular-weight PAA |
|---|---|---|---|---|---|
| C.I Direct Yellow 96 | 0.5 | Dissolved | Precipitated | Solidified | Solidified |
| | 1.0 | Dissolved | Precipitated | Solidified | Solidified |
| | 1.5 | Dissolved | Precipitated | Solidified | Solidified |
| | 2.0 | Dissolved | Precipitated | Solidified | Turbid |
| | 3.0 | Dissolved | Precipitated | Solidified | Turbid |
| C.I Direct Blue 199 | 0.5 | Dissolved | Dissolved | Solidified | Sedimented |
| | 1.0 | Dissolved | Dissolved | Solidified | Slightly Sedimented |
| | 1.5 | Dissolved | Dissolved | Solidified | Dissolved |
| | 2.0 | Dissolved | Dissolved | Solidified | Dissolved |
| | 3.0 | Dissolved | Dissolved | Solidified | Dissolved |
| C.I. Food Black 2 | 0.5 | Dissolved | Dissolved | Aggregated | Viscosity increased |
| | 1.0 | Dissolved | Ink slightly discolored | Aggregated | Viscosity increased |
| | 1.5 | Dissolved | Ink discolored | Aggregated | Viscosity increased |
| | 2.0 | Dissolved | Ink discolored | Aggregated | Solidified |
| | 3.0 | Dissolved | discolored, aggregated | Aggregated | Viscosity increased |

As shown in Table 2, it has been found that when the low-molecular-weight allylamine polymer of the present invention is used as a water-resistance-imparting agent in an ink composition, the ink is free from discoloration and aggregation and is remarkably stable.

EXAMPLE 6

Ink Composition

A water-based ink having the following composition was filtered through a 0.7 μm membrane filter, to prepare a yellow ink composition.

| | |
|---|---|
| Pure water | 76 parts by weight |
| Triethylene glycol | 10 parts by weight |
| Ethylene glycol | 2 parts by weight |
| Dialyzed low-molecular-weight PPA in Example 1 | 10 parts by weight |
| C.I. Direct Yellow 86 | 2 parts by weight |
| Total | 100 parts by weight |

Using above ink composition, full set solid printing with a width of 1.5 cm was made on an ordinary paper sheet having an A-4 size at intervals of 3.5 cm (non-recorded portions) with an inkjet-recording-method-applied printer (BJC-800, supplied by Canon Inc.). A recorded sheet was left naturally for 1 hour, then immersed in water for 1 hour and spontaneously dried for 24 hours, and a non-recorded portion was visually evaluated for a shifted-ink density, and a recorded portion was visually evaluated for a remaining ink.

As a result, the non-recorded portion was almost not colored, and the recorded portion had no change.

COMPARATIVE EXAMPLE 5

Example 6 was repeated except that a yellow ink composition was prepared by not using the dialyzed low-molecular-weight PAA prepared in Example 1 and changing the amount of pure water to 86 parts by weight.

As a result, the ink noticeably adhered to a non-recorded portion, and a decrease in density was observed in a recorded portion.

Industrial Utility

According to the process of the present invention, a low-molecular-weight allylamine polymer improved in coloring or an addition salt thereof can be industrially advantageously produced at a high polymerization rate at high yields. At the same time, impurities from a radical polymerization initiator used in a large amount for the polymerization and other inorganic salts can be also removed.

Further, the low-molecular-weight allylamine polymer or the addition salt thereof, provided by the present invention, can be used in fields where coloring is undesirable or in fields the presence of inorganic salt is undesirable. For example, it can be used preferably in the fields of fine chemicals such as additives for painting compositions, adhesives, anchor coating compositions, chemicals for inkjet printing paper, various binders for making paper, metal corrosion inhibitors, plastic surface treating agents, chemicals for photography, additives to lubricants for precision machines, and the like.

Further, the ink composition provided by the present invention, containing the low-molecular-weight allylamine polymer or its salt of the present invention as a water-resistance-imparting agent, is not only excellent in shelf life but also excellent in water resistance of recorded product, and it is suitable particularly for inkjet recording.

What is claimed is:

1. A process for the production of low-molecular-weight allylamine polymer having a weight average molecular weight of 250 to 4,000 or an addition salt thereof, which comprises neutralizing with an alkali a polymerization solution containing said low-molecular-weight allylamine polymer to bring said allylamine polymer into a free state, then distilling said low-molecular-weight allylamine polymer solution containing an unreacted monoallylamine and a salt, thereby distilling off the unreacted monoallylamine, then, subjecting the residue to electrodialysis, and optionally carrying out acid treatment.

2. The process of claim 1, wherein the electrodialysis is carried out using an ion exchange membrane, and in the electrodialysis, the ion exchange membrane previously used in electrodialysis is used after recovered by effecting backward electric application on the ion exchange membrane.

3. The process of claim 2, wherein an electrolyte in a concentrated liquid vessel during the backward electric application has a pH of 7.5 to 13.5.

* * * * *